United States Patent
Chang et al.

(10) Patent No.: US 9,490,915 B2
(45) Date of Patent: Nov. 8, 2016

(54) SOUND TRANSMITTING APPARATUS, SOUND RECEIVING APPARATUS AND METHOD FOR TRANSFERRING DATA USING SOUND SIGNAL

(71) Applicant: Acer Incorporated, New Taipei (TW)

(72) Inventors: Cheng-Hsin Chang, New Taipei (TW); Wen-Cheng Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 94 days.

(21) Appl. No.: 14/552,484

(22) Filed: Nov. 25, 2014

(65) Prior Publication Data
US 2015/0270908 A1    Sep. 24, 2015

(30) Foreign Application Priority Data
Mar. 19, 2014 (TW) .............................. 103110325 A

(51) Int. Cl.
*H04B 11/00* (2006.01)
*G08C 23/02* (2006.01)

(52) U.S. Cl.
CPC ............... *H04B 11/00* (2013.01); *G08C 23/02* (2013.01)

(58) Field of Classification Search
CPC ................................ H04B 11/00; G10K 11/24
See application file for complete search history.

(56) References Cited

U.S. PATENT DOCUMENTS

| 5,594,435 A | 1/1997 | Remillard |
| 2009/0048852 A1 | 2/2009 | Burns et al. |
| 2014/0119162 A1* | 5/2014 | Yeary ............... G10K 11/24 367/178 |
| 2014/0293754 A1* | 10/2014 | Jang .................. G08C 23/02 367/199 |

* cited by examiner

*Primary Examiner* — Nabil Syed
(74) *Attorney, Agent, or Firm* — Jianq Chyun IP Office

(57) ABSTRACT

A sound transmitting apparatus, a sound receiving apparatus and a method for transferring data from the sound transmitting apparatus to the sound receiving apparatus using a sound signal are provided. In the method, a plurality of basic tones and control tones are defined by using a plurality of sound frequencies within a sound frequency range, in which each basic tone corresponds a character and each control tone corresponds an order of the basic tones. A plurality of characters in the data to be transferred are transformed into corresponding basic tones and the corresponding control tone is determined according to the order of the characters. The basic tones and the control tone are transmitted to the sound receiving apparatus. The sound receiving apparatus transforms the received basic tones into the characters and determines the order of the characters according to the received control tone, so as to recover the data.

10 Claims, 2 Drawing Sheets

SOUND TRANSMITTING APPARATUS, SOUND RECEIVING APPARATUS AND METHOD FOR TRANSFERRING DATA USING SOUND SIGNAL

CROSS-REFERENCE TO RELATED APPLICATION

This application claims the priority benefit of Taiwan application serial no. 103110325, filed on Mar. 19, 2014. The entirety of the above-mentioned patent application is hereby incorporated by reference herein and made a part of this specification.

BACKGROUND OF THE INVENTION

1. Field of the Invention

The invention relates to a sound transmission apparatus and a sound transmission method, and particularly relates to a method and an apparatus for transmitting data using sound signals.

2. Description of Related Art

Frequency-shift keying (FSK) is a technique of transmitting data by using signals differing in frequency. FSK modulates carrier frequencies by using digital signals and realizes identification of signals and transmission of data through variation in frequency. Currently, the FSK technology transmits data by producing ultrasonic waves that are not perceivable by human ears by using a sound-producing array, so as to transmit data using sound signals at different sound frequencies.

For example, Table 1 below is a conventional correspondence table between the sound frequency signals and the characters. As shown in Table 1, when an apparatus A intends to transmit characters 1, 2, and 3 to an apparatus B, the apparatus A may convert the characters 1, 2, and 3 into basic tones 1, 2, and 3 based on Table 1 and sequentially transmits these basic tones to the apparatus B. When the apparatus B receives the basic tones, the apparatus B may convert the basic tones back to the characters 1, 2, 3 based on the definition in Table 1. Accordingly, data transmission is realized.

TABLE 1

| Sound Frequency Signal | Character |
| --- | --- |
| basic tone 15 | F |
| basic tone 14 | E |
| basic tone 13 | D |
| basic tone 12 | C |
| basic tone 11 | B |
| basic tone 10 | A |
| basic tone 9 | 9 |
| basic tone 8 | 8 |
| basic tone 7 | 7 |
| basic tone 6 | 6 |
| basic tone 5 | 5 |
| basic tone 4 | 4 |
| basic tone 3 | 3 |
| basic tone 2 | 2 |
| basic tone 1 | 1 |
| basic tone 0 | 0 |

However, in the data transmission above, each of the basic tones (at an independent sound frequency) only defines one character. Considering that the applicable sound frequency range is limited and the issue of the identification rate of the sound frequency signals, the basic tones that can be used in actual data transmission are quite limited. As a result, the amount of data (i.e., the number of characters) allowed to be transmitted at the same time is restricted, and the data transmission performance is thus influenced.

SUMMARY OF THE INVENTION

The invention provides a sound transmitting apparatus, a sound receiving apparatus, and a method for transmitting data using sound signals, which are capable of increasing the amount of data allowed to be transmitted using the sound signals at the same time.

A method for transmitting data using sound signals of the invention is adapted for transmitting data from a sound transmitting apparatus to a sound receiving apparatus. The method includes steps as follows. The method defines a plurality of basic tones and a plurality of control tones by using a plurality of sound frequencies within a sound frequency range. Each of the basic tones corresponds to a character, and each of the control tones corresponds to an order of the basic tones. Then, a plurality of transmitting characters in the data to be transmitted are converted into the corresponding basic tones. In addition, the corresponding control tone is determined based on the order of the transmitting characters. Afterwards, the converted basic tones and the determined control tone are transmitted to the sound receiving apparatus. The sound receiving apparatus converts the received basic tones into the transmitting characters, and determines the order of the transmitting characters based on the received control tone, so as to recover the data.

The sound transmitting apparatus of the invention includes a sound-producing array and a processor. The sound-producing array produces a plurality of sound signals at a plurality of sound frequencies within a sound frequency range. The sound frequencies define a plurality of basic tones and a plurality of control tones, each of the basic tones corresponds to a character, and each of the control tones corresponds to an order of the basic tones. The processor converts a plurality of transmitting characters in data to be transmitted into the corresponding basic tones, determines the corresponding control tone based on the order of the transmitting characters, and controls the sound-producing array to transmit the converted basic tones and the determined control tone.

The sound receiving apparatus of the invention includes a sound-receiving array and a processor. The sound-receiving array receives at least one basic tone and at least one control tone. The sound-receiving array receives sound signals at a plurality of sound frequencies within a sound frequency range, the sound frequencies define a plurality of basic tones and a plurality of control tones, each of the basic tones corresponds to a character, and each of the control tones corresponds to an order of the basic tones. The processor, converts the basic tones received by the sound-receiving array into transmitting characters, and determines the order of the transmitting characters based on the control tone received by the sound-receiving array, so as to recover data.

Based on the above, the sound transmitting apparatus, the sound receiving apparatus, and the method for transmitting data using sound signals of the invention increase the amount of data allowed to be transmitted by sound frequency signals within a specific sound frequency range, thereby facilitating the transmission performance, by adding the control tones to define the orders of the characters corresponding to the basic tones in addition to the basic tones.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
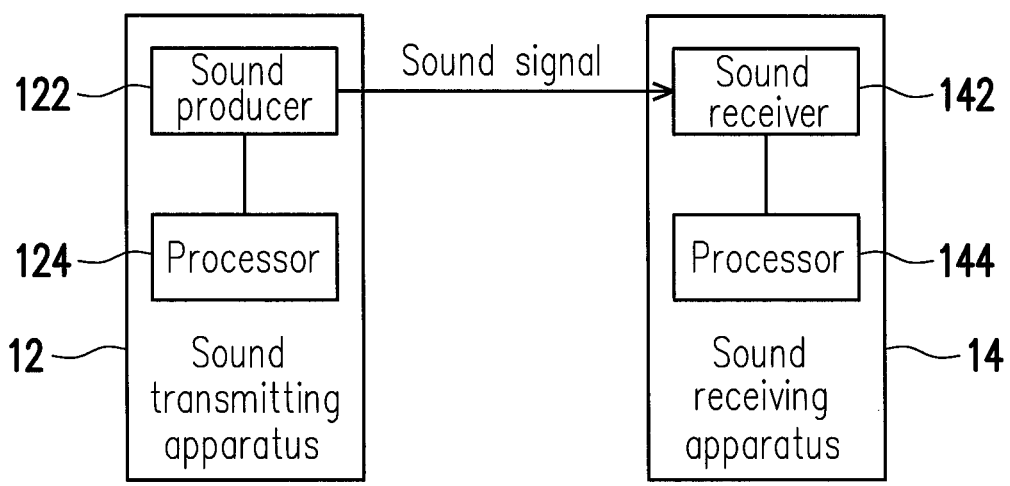
FIG. 1 is a block diagram illustrating a sound transmitting apparatus and a sound receiving apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

To transmit more data within a same time, the invention further defines control tones in addition to basic tones within an applicable sound frequency range, so as to transmit information related to an order of the transmitted basic tones. Accordingly, the number of characters that are allowed to be transmitted by the sound frequencies may be increased within the limited sound frequency range, and data transmission performance is consequently facilitated.

FIG. 1 is a block diagram illustrating a sound transmitting apparatus and a sound receiving apparatus according to an embodiment of the invention. Referring to FIG. 1, in the embodiment, a sound transmitting apparatus 12 transmits data to a sound receiving apparatus 14 by transmitting sound signals. The sound transmitting apparatus 12 and the sound receiving apparatus 14 are, for example, desktop computers or laptop computers having the function of transmitting and/or receiving sound signals, or mobile apparatuses such as mobile phones, smart phones, personal digital assistants (PDAs), media players, or tablet PCs, etc. However, the invention is not limited thereto.

The sound transmitting apparatus 12 includes a sound producer 122 and a processor 124. The sound producer 122 is suitable for producing a sound signal at a sound frequency between 17000 Hz and 22000 Hz. The processor 124 is, for example, a single-core or a multi-core central processing unit (CPU) or other programmable general purpose or special purpose microprocessor, digital signal processor (DSP), programmable controller, application specific integrated circuit (ASIC), or other similar elements or a combination thereof, which is suitable for converting data to be transmitted by the sound transmitting apparatus 12 into basic tones and control tones having different sound frequencies, so as to control the sound producer 122 to produce corresponding sound signals.

The sound receiving apparatus 14 includes a sound receiver 142 and a processor 144. The sound receiver 142 is suitable for receiving a sound signal at a sound frequency between 17000 Hz to 22000 Hz. The processor 144 is similar to the processor 124, which may be a single-core or a multi-core central processing unit or other programmable general purpose or special purpose microprocessor, digital signal processor, programmable controller, application specific integrated circuit, or other similar elements or a combination thereof suitable for converting a sound signal received by the sound receiving apparatus 14 back to data.

Figure 2:
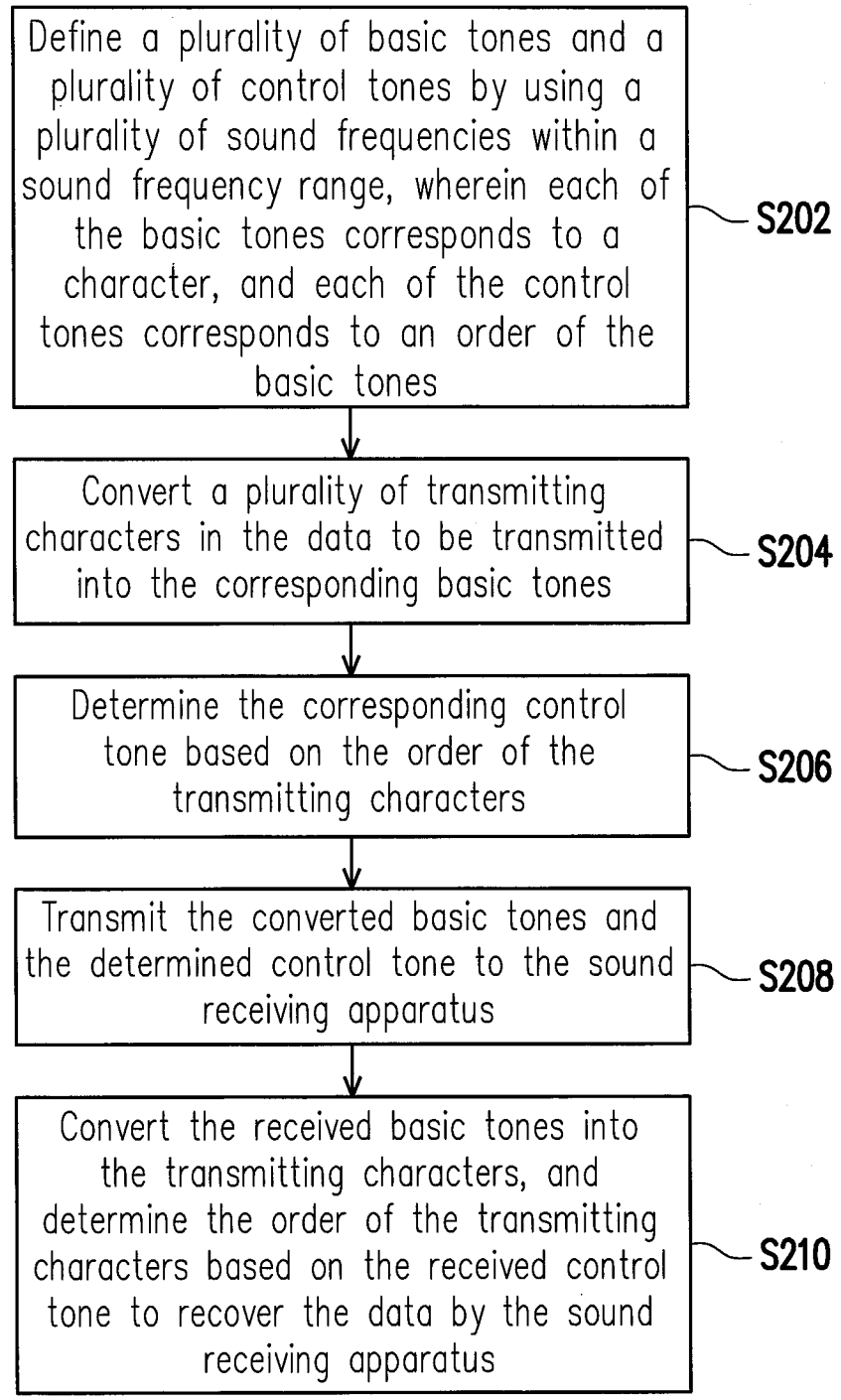
FIG. 2 is a flowchart illustrating a method for transmitting data using sound signals according to an embodiment of the invention.

Based on the frameworks of the sound transmitting apparatus 12 and the sound receiving apparatus 14, the invention further provides a method for transmitting data using sound signals. FIG. 2 is a flowchart illustrating a method for transmitting data using sound signals according to an embodiment of the invention. Referring to FIG. 2, the embodiment is suitable for the sound transmitting apparatus 12 to transmit data to the sound receiving apparatus 14. In the following, components in the sound transmitting apparatus 12 and the sound receiving apparatus 14 shown in FIG. 1 are used to describe details of the flow of the method provided in this embodiment.

First of all, the processor 124 of the sound transmitting apparatus 12 defines a plurality of basic tones and a plurality of control tones by using a plurality of sound frequencies within a sound frequency range. Each of the basic tones corresponds to a character, and each of the control tones corresponds to an order of the basic tones (Step 202). Here, the sound frequency range is between 17000 Hz and 22000 Hz, for example. However, the invention is not limited thereto. In addition, the number of the control tones is determined based on the number of the basic tones under a condition that orders corresponding to the control tones are enough to cover all arrangements of the basic tones.

For example, in an embodiment, Table 1 listed above may be re-defined and added with the control tones, so as to create Table 2 shown below. In this embodiment, control tones 0 to n are added in addition to basic tones 0 to 15, so as to correspond to control channels 0 to n. The control channels 0 to n may be used to define orders of the basic tones 0 to 15, so as to increase the number of data carried with the basic tones 0 to 15.

TABLE 2

| Sound Frequency Signal | Character |
| --- | --- |
| control tone n | control channel n |
| ... | ... |
| control tone 3 | control channel 3 |
| control tone 2 | control channel 2 |
| control tone 1 | control channel 1 |
| control tone 0 | control channel 0 |
| basic tone 15 | F |
| basic tone 14 | E |
| basic tone 13 | D |
| basic tone 12 | C |
| basic tone 11 | B |
| basic tone 10 | A |
| basic tone 9 | 9 |
| basic tone 8 | 8 |
| basic tone 7 | 7 |
| basic tone 6 | 6 |
| basic tone 5 | 5 |
| basic tone 4 | 4 |
| basic tone 3 | 3 |
| basic tone 2 | 2 |
| basic tone 1 | 1 |
| basic tone 0 | 0 |

Frequency values of the basic tones 0 to 15 are shown in Table 3 below, for example. Namely, the frequency values range between 18093.75 Hz (for basic tone 0) and 19500 Hz (for basic tone 15), and frequency differences between adjacent basic tones are all 93.75 Hz, for example. Frequencies values of the control tones 0 to n may be arbitrary values that are reasonable as long as the frequency values of the control tones are not overlapped with the frequency values of the basic tones. For example, given that four control tones are used, the frequency values of the four control tones may be 21000 Hz, 21093.75Hz, 21187.5 Hz, and 21281.25 Hz, or 17000 Hz, 17093.75 Hz, 17187.5 Hz, and 17281.25 Hz. Namely, the frequency values of the control tones may be arbitrary frequency values that range between 17000 Hz and 21000 Hz and are not overlapped with the frequency values of the basic tones. The sound frequencies of the basic tones and the control tones described above only serve as an illustrative purpose without the intention of defining the invention. Frequency values that are distinguishable from each other may serve as the sound frequencies of the basic tones and the control tones of this embodiment.

TABLE 3

| basic tone 15 | 19500 |
| basic tone 14 | 19406.25 |
| basic tone 13 | 19312.5 |
| basic tone 12 | 19218.75 |
| basic tone 11 | 19125 |
| basic tone 10 | 19031.25 |
| basic tone 9 | 18937.5 |
| basic tone 8 | 18843.75 |
| basic tone 7 | 18750 |
| basic tone 6 | 18656.25 |
| basic tone 5 | 18562.5 |
| basic tone 4 | 18468.75 |
| basic tone 3 | 18375 |
| basic tone 2 | 18281.25 |
| basic tone 1 | 18187.5 |
| basic tone 0 | 18093.75 |

Back to the flow of FIG. 2, when the sound transmitting apparatus 12 is about to transmit data to the sound receiving apparatus 14, the processor 124 of the sound transmitting apparatus 12 may, for example, convert a plurality of transmitting characters in the data into the corresponding basic tones (Step 204). For example, based on Table 2 above, the processor 124 may convert hexdecimal characters 0 to F into the basic tones 0 to 15. Then, the processor 124 determines the corresponding control tone based on the order of the transmitting characters (Step 206). The processor 124 may look up Table 2 to find the control tone corresponding to the order of the transmitting characters. The number of the control tone is not limited to one. A combination of a plurality of the control tones may be used. Lastly, the processor 124 controls the sound producer 122 to transmit the basic tones converted by the processor 124 and the control tone determined by the processor 124 to the sound receiving apparatus 14 (Step S208).

On the other hand, when the sound receiving apparatus 14 receives the basic and control tones transmitted by the sound transmitting apparatus 12 through the sound receiver 142, the processor 144 may, for example, convert the basic tones received by the sound receiver 142 into the transmitting characters and determine the order of the transmitting characters based on the control tone received by the sound receiver 142, and finally recover the data transmitted by the sound transmitting apparatus 12 according to the ordered transmitting characters (Step S210).

It should be noted that when there are more basic tones to be transmitted within a same time, the required number of the control tones may increase accordingly. For example, when three entries of data need to be transmitted within a same time, four control tones are required to define the order of the basic tones. When four entries of data need to be transmitted within a same time, six control tones are required to define the order of the basic tones.

In detail, when three entries of data need to be transmitted within the same time, since the three entries of data correspond to three basic tones, and there are $3!+3!/2!+3!/3!=10$ possible arrangements of the three basic tones, it requires four control tones (i.e., $2^4=16$ possible arrangements) to cover all of the possible arrangements (10 arrangements) of the three basic tones. Correspondence between orders of the three basic tones and the four control tones used for distinguishing the orders of the three basic tones is illustrated and provided as Table 4 below.

TABLE 4

| control tone 0 | control tone 1 | control tone 2 | control tone 3 | Order of the basic tones |
|---|---|---|---|---|
| 0 | 0 | 0 | 0 | 1, 2, 3 |
| 0 | 0 | 0 | 1 | 2, 1, 3 |
| ... | ... | ... | ... | ... |
| 1 | 1 | 1 | 1 | 3, 2, 1 |

Based on the table above, if an apparatus A intends to transmit characters "426" to an apparatus B, the apparatus A may, based on an arrangement in sound frequencies of the basic tones, look up Table 4 to find out that a value of the control channel thereof is (0,0,0,1). Namely, since the order of the characters "426" is: the second highest frequency, then the highest frequency, and then the lowest frequency, the sound signals to be transmitted by the apparatus A after referring to Table 4 are: the control tone 3, the basic tone 4, the basic tone 2, and the basic tone 6. Correspondingly, by referring to Table 4, the apparatus B may obtain the order of the received three basic tones as: the second highest frequency, then the highest frequency, and then the lowest frequency, so as to derive that the correct arrangement of the basic tones is: the basic tone 4, the basic tone 2, and then the basic tone 6, namely, the characters "426."

Also, when four entries of data need to be transmitted within a same time, the four entries of data correspond to four basic tones, and there are $4!+4!/3!+4!/(2!*2!)+4!/4!=35$ possible arrangements of the four basic tones, so it requires six control tones (i.e., $2^6=64$ possible arrangements) to cover all of the possible arrangements (35 arrangements) of the four basic tones. Correspondence between orders of the four basic tones and the six control tones used for distinguishing the orders of the four basic tones is illustrated as Table 5 below.

TABLE 5

| control tone 0 | control tone 1 | control tone 2 | control tone 3 | control tone 4 | control tone 5 | Order of the basic tones |
|---|---|---|---|---|---|---|
| 0 | 0 | 0 | 0 | 0 | 0 | 1, 2, 3, 4 |
| 0 | 0 | 0 | 1 | 0 | 1 | 2, 1, 3, 4 |
| ... | ... | ... | ... | ... | ... | ... |
| 1 | 1 | 1 | 1 | 1 | 1 | 4, 3, 2, 1 |

Based on the table above, if an apparatus A intends to transmit characters "4268" to an apparatus B, the apparatus A may, based on the arrangement in sound frequencies of the basic tones, find out that a value of the control channel thereof is (0,0,0,0,0,1) by referring to Table 5. Namely, since the order of the characters "4268" is: the second highest frequency, then the highest frequency, then the third highest frequency, and then the lowest frequency, the sound signals to be transmitted by the apparatus A after referring to Table 5 are: the control tone 5, the basic tone 4, the basic tone 2, the basic tone 6, and the basic tone 8. Correspondingly, by referring to Table 5, the apparatus B may be provided with that the order of the received four basic tones is: the second highest frequency, then the highest frequency, then the third highest frequency, and then the lowest frequency, so as to derive that the correct arrangement of the basic tones is: the basic tone 4, the basic tone 2, then the basic tone 6, and then the basic tone 8, namely the characters "4268."

In view of the foregoing, the sound transmitting apparatus, the sound receiving apparatus, and the method for transmitting data using the sound signals add the control tones to record the order of the basic tones in addition to the basic tones corresponding to the characters, so the number of characters represented by the basic tones can be increased. Thus, more characters may be transmitted within a same time and within the limited sound frequency range, so as to facilitate the sound frequency transmission performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting data using sound signals, adapted for a sound transmitting apparatus having a sound-producer array and a processor to transmit data to a sound receiving apparatus having a sound-receiving array, comprising:
    defining by the processor a plurality of basic tones and a plurality of control tones by using a plurality of sound frequencies within a sound frequency range, wherein each of the basic tones corresponds to a character, and each of the control tones corresponds to an order of the basic tones;
    converting by the processor a plurality of transmitting characters in the data to be transmitted into the corresponding basic tones;
    determining by the processor the control tone based on the order of the transmitting characters;
    transmitting by the processor the converted basic tones and the determined control tone to the sound receiving apparatus by using the sound-producer array; and
    converting by the sound receiving apparatus the received basic tones into the transmitting characters by using the sound-receiving array, and determining the order of the transmitting characters based on the received control tone, so as to recover the data.

2. The method for transmitting the data using the sound signals as claimed in claim 1, wherein the step of defining by the processor the basic tones and the control tones by using the sound frequencies within the sound frequency range comprises:
    determining by the processor the number of the control tones based on the number of the basic tones allowing the orders corresponding to the control tones to cover all arrangements of the basic tones.

3. The method for transmitting the data using the sound signals as claimed in claim 1, wherein the step of transmitting by the processor the converted basic tones and the determined control tone to the sound receiving apparatus by using the sound-producer array comprises:
    only transmitting by the processor the sound signal at the sound frequency corresponding to one of the basic tones and the control tones within a unit time without using other sound frequencies by using the sound-producer array.

4. The method for transmitting the data using the sound signals as claimed in claim 1, wherein the sound frequency range is between 17000 Hz and 22000 Hz.

5. A sound transmitting apparatus, comprising:
    a sound-producer array, producing a plurality of sound signals at a plurality of sound frequencies within a sound frequency range, wherein the sound frequencies define a plurality of basic tones and a plurality of control tones, each of the basic tones corresponds to a character, and each of the control tones corresponds to an order of the basic tones; and
    a processor, converting a plurality of transmitting characters in data to be transmitted into the corresponding basic tones, determining the corresponding control tone based on the order of the transmitting characters, and controlling the sound-producing array to transmit the converted basic tones and the determined control tone.

6. The sound transmitting apparatus as claimed in claim 5, wherein the processor determines the number of the control tones based on the number of the basic tones allowing the orders corresponding to the control tones to cover all arrangements of the basic tones.

7. The sound transmitting apparatus as claimed in claim 5, wherein the sound-producing array only transmits the sound at the sound frequency corresponding to one of the basic tones and the control tones within a unit time without using other the sound frequencies.

8. The sound transmitting apparatus as claimed in claim 5, wherein the sound frequency range is between 17000 Hz and 22000 Hz.

9. A sound receiving apparatus, comprising:
    a sound-receiving array, receiving at least one basic tone and at least one control tone, wherein the sound-receiving array receives a plurality of sound signals at a plurality of sound frequencies within a sound frequency range, the sound frequencies define a plurality of basic tones and a plurality of control tones, each of the basic tones corresponds to a character, and each of the control tones corresponds to an order of the basic tones; and
    a processor, converting the basic tones received by the sound-receiving array into a plurality of transmitting characters, and determining the order of the transmitting characters based on the control tone received by the sound-receiving array, so as to recover data.

10. The sound receiving apparatus as claimed in claim 9, wherein the sound frequency range is between 17000 Hz and 22000 Hz.

* * * * *